Jan. 7, 1969            E. S. BAKER            3,421,005
AMBIENT LIGHT CONTROLLED SOLID STATE RELAY
Filed Jan. 6, 1966
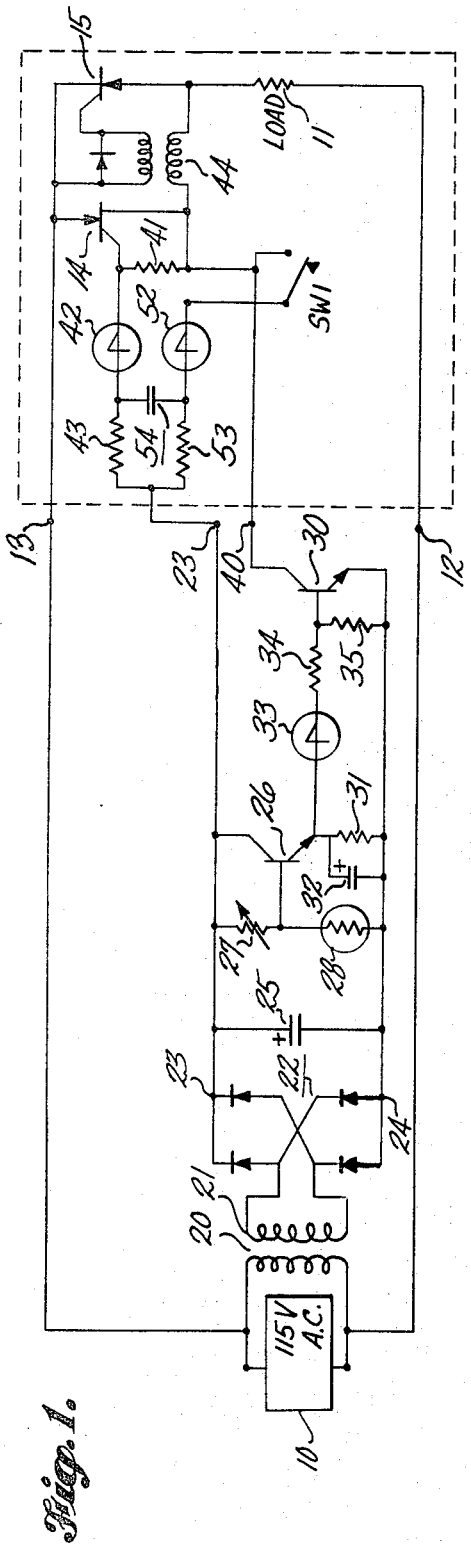
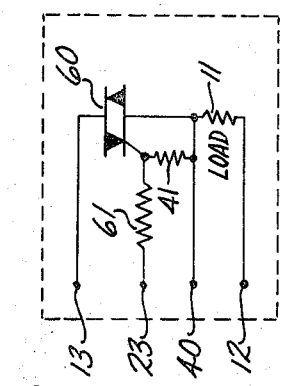
INVENTOR.
EDWARD S. BAKER
BY
Christensen, Sanborn & Matthews
ATTORNEYS

United States Patent Office 3,421,005
Patented Jan. 7, 1969

3,421,005
AMBIENT LIGHT CONTROLLED SOLID STATE RELAY
Edward S. Baker, Seattle, Wash., assignor to The Boeing Company, Seattle, Wash., a corporation of Delaware
Filed Jan. 6, 1966, Ser. No. 519,076
U.S. Cl. 250—206        6 Claims
Int. Cl. H01j *39/12;* G01j *1/00;* H03k *3/26*

ABSTRACT OF THE DISCLOSURE

The present invention relates to an improved system for controlling the flow of current to a load in accordance with ambient light intensity. Load current control devices in series circuit with a load are controlled in accordance with the resistance of a light dependent device through the use of an isolation circuit which draws little or no current when there is no current to the load. A voltage sensitive device such as a Shockley diode which conducts only after its threshold voltage has been exceeded, and yet remains conductive thereafter even though the voltage thereacross is reduced below the threshold, interconnects two control transistors which are connected between the load control circuit and the light dependent device.

---

Current control systems which are responsive to ambient light conditions are in widespread use for controlling the energization of an electrical load. In the control of outdoor lights it is common practice to make use of ambient light detectors in the system for turning on lights as evening approaches. Electromechanical devices such as relays have been used in such systems even though in practice it is often found that the same are not reliable over a long period of time. One of the reasons for poor reliability of such systems making use of electromechanical current switching devices is that chattering of the relay contacts occurs when the system is at the point of being fully turned on. This causes the relay contacts to arc and burn and to sometimes stick closed or fail to make complete contact. The operation of ambient light sensing units at the current levels required for proper operation of the relays also tends to decrease the life of the sensing device.

Some of the problems noted above with respect to the use of electromechanical relays are also encountered when solid state devices such as silicon controlled rectifiers (SCR's) are used as the current control devices in that it remains equally important even in systems using solid state devices to operate a light dependent element at the lowest power possible. The level of gating signal necessary to cause an SCR to conduct varies inversely with temperature, and in addition, it is found that the required gating signal often varies from one SCR to another even within the same specification. Thus it is generally considered poor circuit design to depend on the gating sensitivity of a particular SCR, particularly at low temperatures, and accordingly it is advantageous to have gating signals of a level greater than the indicated minimum for a given device.

Thus it is an object of the present invention to provide an improved ambient light responsive current control system. Another object of the present invention is to provide a solid state relay controlled by ambient light conditions. Another object of the present invention is to provide a light controlled current control system using solid state devices and wherein turn on of the system is assured regardless of temperature conditions or variations in the sensitivity of the individual current control devices utilized in the system. A further object of the present invention is to provide an improved and low cost ambient light control solid state relay system making use of silicon controlled rectifiers wherein snap action firing of the SCR's is achieved. Another object of the present invention is to provide an ambient light current control system wherein the light sensing element is operated at low voltage and current levels. An additional object of the present invention is to provide a simplified and low cost ambient light controled solid state relay having the capability of energizing a given load when ambient light conditions change at a very slow rate. A further object of the invention is to provide a system wherein energization of the load occurs selectively in either continuous or intermittent fashion.

The above objects and additional advantages are achieved through the use of a circuit arrangement wherein one or more silicon controlled rectifiers or similar devices are connected in current control circuit relation with a load across an alternating current power supply. The load being controlled can, for example, be one or more electric light bulbs which are to be turned on or off in accordance with ambient light conditions. The state of conduction of the current controlling silicon controlled rectifiers is controlled by a circuit arrangement which includes a pair of transistors connected as a current amplifier. The current amplifier is coupled with a light sensing element such as a light dependent resistor (LDR) and with the SCR's in a manner such that the SCR's are driven by signals well in excess of the minimum required even though the LDR undergoes very gradual resistance changes and is subjected only to low voltage and current conditions. The LDR is connected in a bridge circuit across a pair of DC potential terminals in a manner such that an operating voltage is provided which is proportional to the intensity of the light impinging thereon. As the intensity of the surrounding light decreases the impedance of the light sensing element increases and thus in one circuit arrangement the conduction of a first transistor increases. A voltage sensing device such as a Shockley diode interconnects the two transistors in a manner such that conduction of the second transistor is prevented during the time that the state of conduction of the first transistor increases gradually due to gradual changes in ambient light conditions. When the voltage across the load of the first transistor reaches the threshold or breakdown voltage level for the Shockley diode, the Shockley diode conducts and the second transistor coupled with the gate electrode of a main current SCR turns on. When the Shockley diode conducts the current load of the first transistor is materially increased and thus the current amplification factor of the first transistor is increased. As a result, the necessary sustaining current for the Shockley diode is assured for the then existing resistance of the light dependent resistor, even though the turn-on point was very gradually approached in terms of changing light conditions. The result is that a snap-action turn-on is achieved and system oscillation is avoided.

In one preferred embodiment of the invention second and third Shockley diodes and a capacitor are connected in the load circuit of the second transistor and coupled with the gate electrode of a main current SCR to provide an oscillator. The signals from the oscillator are applied to the gate of the SCR to cause the SCR to be alternately conductive and nonconductive. A manual switch is provided in the circuit so that steady-state application of current to the load occurs when the second transistor conducts or in the alternative, by operation of the switch, the oscillator action of the second and third Shockley diodes serves to intermittently turn the current to the load on and off.

The present invention will be more clearly understood from the following description when read with reference to the accompanying drawing and wherein:

FIGURE 1 is a schematic circuit diagram of a preferred embodiment of the invention which permits either continuous or intermittent energization of a load when ambient light conditions reach a selected level;

FIGURE 2 is a schematic circuit diagram of an alternative embodiment of the invention making use of a simplified current control element connected in series circuit with the load; and FIGURE 3 is a schematic circuit diagram of a further embodiment of the invention making use of another simplified current control circuit connected in series with the load, with FIGURES 2 and 3 being illustrated for use with the portion of the circuit of FIGURE 1 outside of the FIGURE 1 dashed lines.

Referring now to the drawing and in particular to FIGURE 1, the system is shown as controlling the application of power from a supply 10 to a load 11 which might be one or more electric lights which are to be turned on or off in accordance with ambient light conditions. One of the main power supply terminals 12 is directly connected to the load 11 while the other terminal 13 is connected to the load 11 through the reversely connected current control devices shown as silicon controlled rectifiers 14 and 15. The arrangement is such that full wave power is applied to the load when the SCR's 14 and 15 are provided with appropriate gating signals.

Operating power for the control circuit is obtained from the power supply 10 through the transformer 20 having its secondary winding 21 connected to the full wave rectifier circuit 22 so that DC operating potential is provided between the positive and negative DC terminals 23 and 24. A filter capacitor 25 connected between terminals 23 and 24 stabilizes the DC operating potential.

In many of the applications for systems of the type herein disclosed it is necessary that SCR turn on be assured under varying temperature conditions. Thus sufficient signal energy must be provided for assuring turn on even at low temperatures. Thus the system of the present invention includes NPN transistors 26 and 30 between the light sensing element and the SCR's to provide amplification of the signals provided by varying light conditions. As explained hereinafter, transistors 26 and 30 are connected as a current amplification circuit which controls the gate of SCR 14. The base of transistor 26 is connected to the junction of a resistor shown for purpose of illustration as a variable resistor 27 and a light dependent resistor (LDR) 28 connected in a voltage divider arrangement across the terminals 23 and 24. The resistor 31 and capacitor 32 connect the emitter of transistor 26 to terminal 24. The emitter of transistor 26 is also coupled to the base of transistor 30 in a manner such that the base of transistor 30 is provided with current only when the voltage on the emitter of transistor 26 reaches a predetermined threshold level. Thus Shockley diode 33 and resistor 34 are connected in series circuit between the emitter of transistor 26 and the base of transistor 30. A bias resistor 35 connects the base of transistor 30 to terminal 24.

When the LDR 28 is illuminated with normal daylight its resistance is low and accordingly the base of transistor 26 is maintained substantially at the potential of the emitter and little or no current flows through transistor 26. When the ambient light decreases to a low intensity, as for example during the evening, the resistance of LDR 28 increases causing an increased voltage to be applied to the base of transistor 26. This increase in voltage causes additional base current to be provided to transistor 26 and hence the emitter current of transistor 26 also increases. The increased emitter current flowing through resistor 31 produces an increased voltage across the voltage sensitive device illustrated as the Shockley diode 33. When the threshold voltage of the device 33 is reached, it suddenly becomes conductive (prior to such time no current flows therethrough). When the device 33 becomes conductive base current is applied to transistor 30 rendering it conductive for the application of a gating signal to the SCR 14 in the manner described below. It should be noted that prior to breakdown of diode 33 the relatively large resistor 31 constitutes the only load on transistor 26. However when the Shockley diode conducts and transistor 30 turns on the load on transistor 26 is increased. Thus the circuit makes use of the fact that the DC current gain of transistors changes as the emitter current changes. In the circuit illustrated the increased current through the emitter circuit of transistor 26 places the transistor in a high current gain mode of operation and thus sufficient drive is provided for the SCR circuit even though low cost transistors are used.

The collector of transistor 30 is connected to a terminal 40 which is in turn connected to the gate electrode of SCR 14 by the resistor 41. The gate electrode of SCR 14 is also connected to the DC supply terminal 23 by a second Shockley diode 42 and resistor 43 and thus it will be seen that the SCR 14 will be provided with a gating signal when the transistor 30 is conductive. A current transformer 44 is connected in the cathode circuit of SCR 14 with the secondary winding of the current transformer 44 being coupled with the gate electrode of SCR 15 in a manner which is common in the art. The collector of transistor 30 is further coupled with the positive DC terminal 23 through the series circuit comprising the switch SW1, Shockley diode 52, and resistor 53. A capacitor 54 will be seen to be connected directly between the respective junctions of resistor 43 and Shockley diode 42, and resistor 53 and Shockley diode 52.

The operation of the circuit in FIGURE 1 is as follows. During normal daylight conditions the resistance of LDR 28 is such that the base of transistor 26 is very near to the potential on the emitter of transistor 26 and hence little or no current flows through resistor 31. As evening approaches and less light is provided to LDR 28 an increasing voltage is applied to the base of transistor 26 and hence increasing current is provided through ressitor 31. When the voltage across resistor 31 reaches the breakdown voltage for the Shockley diode 33, the Shockley diode 33 suddenly becomes conductive and base current is applied to the transistor 30. Thus transistor 30 conducts and the Shockley diode 42 connected to the gate of SRC 14 is subjected to sufficient voltage to cause it to conduct. A gating signal is therefore provided to the SCR 14. The above occurs in a few microseconds and results in the gate of the SCR 14 being provided with a voltage and current well in excess of that required to cause it to conduct.

Once the Shockley diode 33 conducts, it requires a minimum holding current to remain conductive. However when the Shockley diode 33 conducts, the current gain of transistor 26 increases and thus sufficient holding current for Shockley diode 33 is assured for the resistance of LDR 28 giving rise to the turnon voltage for Shockley diode 33.

When the ambient light on LDR 28 increases the resistance of the LDR decreases causing the voltage applied to the base of transistor 26 to be lowered. The associated decrease in current flow through transistor 26 results in decreased current for the Shockley diode 33 until the minimum required holding current is no longer provided and the Shockley diode 33 becomes nonconductive. This renders transistor 30 nonconductive and removes the gating signal for SCR 14. Thus when the anode of SCR 14 next goes negative the SCR 14 will remain nonconductive, further gating signals will not be provided to SCR 15, and power for the load 11 will be discontinued.

It should be noted that the transistor 30 is nonconductive and that the transistor 26 has the relatively small load of the high impedance resistor 31 during the time when the LDR 28 is highly illuminated. Thus the current drain or wasted power during the time when current is not being applied to the load 11 is maintained at a very low level. The Shockley diode 33 is a device which has a very stable turn-on threshold voltage and thus it should also be noted that even though the resistance of LDR 28 changes very gradually due to very gradual ambient light changes, the "turn-on" and "turn-off" action is essentially a "snap-action" and the circuit does not have the usual unstable condition normally associated with light conditions at the threshold of turn-on and turn-off.

When the circuit of FIGURE 1 is used in the manner illustrated with switch SW1 open, power is applied in a continuous manner to the load 11 once the ambient light has been reduced to the level to cause gating signals to be applied to SCR 14. When the switch SW1 is closed, the third Shockley diode 52 and resistor 53 are then connected to the collector terminal 40 of transistor 30, resulting in the intermittent application of power to the load 11 when the transistor 30 conducts. When the Shockley diode 42 conducts it will be seen that capacitor 54 starts to charge. When the voltage of capacitor 54 reaches the breakdown voltage of Shockley diode 52 it will become conductive. When this occurs Shockley diode 52 acts as a short circuit bypass around the Shockley diode 42 so that diode 42 is no longer provided with the necessary sustaining current to hold it conductive. Thus the gate signal for SCR 14 is removed during the time that Shockley diode 52 is conductive. When Shockley diode 52 conducts, the capacitor 54 charges in the reverse direction until it reaches the voltage level required for causing diode 42 to again become conductive. Thus the Shockley diodes 52 and 42 together with capacitor 54 and the associated resistors act much like a relaxation oscillator to cause the periodic application of gate signals to SCR 14 and hence turn-on and turn-off of current to the load 11. Thus if the load 11 is a light bulb it will be seen that the same will be flashed on and off if the switch SW1 is in a closed condition and the ambient light conditions are such that transistor 30 is rendered conductive in the manner previously described. The blinking rate is determined by resistors 43, 53, and capacitor 54.

In the embodiment shown in FIGURE 2 a triac 60 is adapted for connection in series circuit with the load 11 across the power supply terminals 12 and 13 of FIGURE 1. It will be seen that a bias resistor 61 is connected directly between the gate of the triac 60 and the positive DC terminal 23 while the collector terminal 40 for transistor 30 is connected directly to the triac 60 through the resistor 41. The triac 60 is effectively a pair of SCR's back-to-back so that the same is rendered conductive regardless of when the gating signal is applied between the gate electrode and the terminal 40. Thus a low cost control circuit is provided for the load 11 with the advantage of FIGURE 1 relating to the intermittent application of power to the load 11 being absent in the embodiment of FIGURE 2. The embodiment of FIGURE 3 is similar in that SCR's 14 and 15 are seen to be under the direct control of transistor 30 since the gate of SCR 14 is connected directly through resistor 72 to the positive DC terminal 23 and through the resistor 71 directly to the collector terminal 40.

In one system using a 16 volt secondary winding 21 the resistor 27 was 100,000 ohms and thus the current through the LDR 28 was at all times very low. In that system type 40314 transistors and 2N687 SCR's were used to control 4000 watts of power. Resistors 31 and 35 were each 10,000 ohms, 34 was 560 ohms, and 41 was 150 ohms. Ten volt 4 layer diodes made by the Motorola Company were used for diodes 33, 42, and 52. Such devices, commonly referred to as Shockley diodes, have the characteristic that they remain nonconductive until their threshold or breakdown voltage is reached. Then once rendered conductive they remain conductive so long as they are provided with holding current even though the voltage to which they are subjected decreases. Thus it will be seen that when the ambient light is reduced to a first intensity power is applied to the load, and yet the later increase of light intensity to said first intensity does not turn the load power off. The circuit therefore has a hysteresis characteristic since the power goes off only after the ambient light increases to a second intensity greater than said first intensity. This avoids any problem of system oscillation and is also of particular value in those applications wherein it is desirable or necessary to have turn-on and turn-off occur at different light levels. It is of course obvious that the collector of transistor 30 can be coupled to the load circuit to shunt the gate signals away from SCR 14 when the transistor is conducting so that power is normally applied to the load when transistor 30 is nonconductive. Power to the load would then be prevented with the transistor 30 conductive.

There has thus been disclosed an improved and simplified control system for controlling the application of current to a load in accordance with ambient light conditions. The system is of particular advantage in those uses wherein the ambient light conditions undergo a very gradual change as is typically the case in outdoor lighting arrangements. The system can also be used in other arrangements, as for example in an alarm system wherein a beam of light is directed against the LDR 28 so that interruption of the same causes activation of the circuit in the manner previously described. Even though the light applied to the LDR 28 might be changed very gradually, the circuit operates to provide a positive snap-action turn-on and turn-off.

The invention has been disclosed with reference to specific embodiments in order to aid in teaching the inventive concepts. However it is to be understood that those modifications which become obvious to a person skilled in the art as a result of the teachings hereof are to be encompassed by the following claims.

What is claimed is:

1. A light sensitive current control system comprising in combination: a source of operating power; a first transistor having an emitter-collector circuit and a first control electrode; a first impedance element connected in series circuit with said emitter-collector circuit across said source; a second impedance element; a light sensitive impedance element connected in series circuit with said second impedance element and coupled with said control electrode; power supply current control means for controlling the flow of current from a power supply to a load and having a second control electrode; a third impedance element connected to said second control electrode; and circuit means including a second transistor coupled with said first impedance element and having an emitter-collector circuit connected in series circuit with said third impedance element to said source for controlling the flow of current through said third impedance element in accordance with current flow through said first impedance element; said last named circuit means including a Shockley diode connected in parallel with first impedance element and coupled with the base of said second transistor to control the state of conduction thereof, said diode remaining nonconductive until a predetermined threshold voltage is established thereacross and then remaining conductive so long as a minimum sustaining current is supplied thereto even though the voltage thereacross is reduced below said threshold voltage.

2. A light sensitive current control system comprising in combination: a source of operating power; a first transistor having an emitter-collector circuit and a first control electrode; a first impedance element connected in series circuit with said emitter-collector circuit across said source; a second impedance element; a light sensitive impedance element connected in series circuit with said second impedance element and coupled with said control electrode; power supply current control means including a silicon controlled rectifier for controlling the flow of current from a power supply to a load and having a gate control electrode; a third impedance element connected between the gate and cathode of said controlled rectifier; and circuit means couped with said first impedance element, with said third impedance element, and with said source for controlling the flow of current through said third impedance element in accordance with current flow through said first impedance element, said last named circuit means including voltage responsive means coupled with said first and third impedance elements and which is nonconductive until a predetermined threshold voltage is established thereacross and then remains conductive so long as a minimum sustaining current is supplied thereto even though the voltage thereacross is reduced below said threshold voltage.

3. A system as defined in claim 2 wherein said last named circuit means includes a second transistor having said third impedance element in its load circuit and wherein said voltage responsive means is a Shockley diode connected between the base of said second transistor and said first impedance element.

4. A light sensitive current control system comprising in combination: a source of operating power; a first transistor having an emitter-collector circuit and a first control electrode; a first impedance element connected in series circuit with said emitter-collector circuit across said source; a second impedance element; a light sensitive impedance element connected in series circuit with said second impedance element and coupled with said control electrode; power supply current control means for controlling the flow of current from a power supply to a load and having a second control electrode; a third impedance element connected to said second control electrode; circuit means coupled with said first impedance element, with said third impedance element, and with said source for controlling the flow of current through said third impedance element in accordance with current flow through said first impedance element, said last named circuit means including voltage responsive means coupled with said first and third impedance elements and which is nonconductive until a predetermined threshold voltage is established thereacross and then remains conductive so long as a minimum sustaining current is supplied thereto even though the voltage thereacross is reduced below said threshold voltage; a first Shockley diode connected in series circuit with said third impedance element; a second Shockley diode; switch means coupled with said third impedance element and with said second diode for selectively connecting said second diode in parallel circuit with the series circuit of said first diode and said third impedance element; and capacitor means connected between said Shockley diodes.

5. A system as defined in claim 4 wherein said voltage responsive means includes a third Shockley diode connected to said first impedance element and to said source.

6. A system as defined in claim 4 wherein said last named circuit means includes a second transistor having an emitter-collector circuit connected in series circuit with said third impedance element and said first Shockley diode across said source, and wherein said voltage responsive means includes a third Shockley diode connected between the base of said second transistor and said first impedance element.

References Cited

UNITED STATES PATENTS

| | | | |
|---|---|---|---|
| 3,104,323 | 9/1963 | Over et al. | 307—311 X |
| 3,207,948 | 9/1965 | Beguin | 307—311 X |
| 3,231,787 | 1/1966 | Knudson | 307—311 X |
| 3,323,071 | 5/1967 | Mitchell | 307—305 X |
| 3,325,680 | 6/1967 | Amucher | 307—311 |

ROBERT SEGAL, *Primary Examiner.*

C. R. CAMPBELL, *Assistant Examiner.*

U.S. Cl. X.R.

250—214; 307—305, 311; 315—158